(12) United States Patent
Staiger et al.

(10) Patent No.: US 12,452,785 B2
(45) Date of Patent: Oct. 21, 2025

(54) SENSOR FOR GENERATING POWER MANAGEMENT DATA

(71) Applicant: VEGA Grieshaber KG, Wolfach (DE)

(72) Inventors: Holger Staiger, Hardt (DE); Patrick Moser, Seelbach (DE)

(73) Assignee: VEGA Grieshaber KG, Wolfach (DE)

( * ) Notice: Subject to any disclaimer, the term of this patent is extended or adjusted under 35 U.S.C. 154(b) by 338 days.

(21) Appl. No.: 17/784,998

(22) PCT Filed: Sep. 7, 2020

(86) PCT No.: PCT/EP2020/074964
§ 371 (c)(1),
(2) Date: Jun. 13, 2022

(87) PCT Pub. No.: WO2021/121689
PCT Pub. Date: Jun. 24, 2021

(65) Prior Publication Data
US 2023/0021763 A1    Jan. 26, 2023

(30) Foreign Application Priority Data

Dec. 17, 2019  (DE) .................. 10 2019 219 889.9

(51) Int. Cl.
*H04W 52/02*   (2009.01)
(52) U.S. Cl.
CPC ... *H04W 52/0203* (2013.01); *H04W 52/0261* (2013.01)

(58) Field of Classification Search
CPC ......... H04W 52/0203; H04W 52/0261; H04Q 2209/88; H04Q 9/00; H04Q 2209/826; Y02D 30/70; G01D 21/00
See application file for complete search history.

(56) References Cited

U.S. PATENT DOCUMENTS

| | | |
|---|---|---|
| 5,440,501 A | 8/1995 | Shimomura et al. |
| 9,182,295 B1 | 11/2015 | Perrott et al. |
| 9,736,776 B2 | 8/2017 | Zhu et al. |

(Continued)

FOREIGN PATENT DOCUMENTS

| | | |
|---|---|---|
| CN | 101222397 A | 7/2008 |
| CN | 103476147 A | 12/2013 |

(Continued)

OTHER PUBLICATIONS

International Search Report issued in International Application No. PCT/EP2020/074964, mailed Nov. 30, 2020, 6 pages.

(Continued)

*Primary Examiner* — Sujoy K Kundu
*Assistant Examiner* — Raul Rivas
(74) *Attorney, Agent, or Firm* — Sterne, Kessler, Goldstein &Fox P.L.L.C.

(57) ABSTRACT

Sensor having a control unit, configured to analyze data available to the sensor, in particular measurement data of the sensor, for generating power management data, the power management data being configured to for select a power saving mode from a plurality of available power saving modes of a wireless module (103) of the sensor and/or for controlling the times of measurement intervals of the sensor and/or for power management of the sensor.

12 Claims, 2 Drawing Sheets

(56) References Cited

U.S. PATENT DOCUMENTS

| | | | |
|---|---|---|---|
| 10,168,224 B2 | 1/2019 | Tanabe | |
| 10,914,808 B2 | 2/2021 | Danesh et al. | |
| 2008/0221836 A1* | 9/2008 | Tateson | G01D 9/005 |
| | | | 702/188 |
| 2014/0225747 A1 | 8/2014 | Abts | |
| 2016/0047679 A1* | 2/2016 | Jernigan | G01D 3/10 |
| | | | 702/116 |
| 2016/0148501 A1 | 5/2016 | Mou et al. | |
| 2016/0295504 A1 | 10/2016 | Wang et al. | |
| 2017/0276527 A1 | 9/2017 | Chen et al. | |
| 2021/0028680 A1* | 1/2021 | Kim | G01M 15/05 |

FOREIGN PATENT DOCUMENTS

| | | |
|---|---|---|
| CN | 104063221 A | 9/2014 |
| CN | 102355319 A | 2/2015 |
| CN | 105628569 A | 6/2016 |
| CN | 208477749 U | 2/2019 |
| CN | 109425846 A | 3/2019 |
| DE | 43 21 256 A1 | 1/1994 |
| DE | 102019219889 B3 | 3/2021 |
| EP | 2827208 A2 | 1/2015 |
| EP | 3 035 010 A1 | 6/2016 |
| JP | 2009180648 A | 8/2009 |
| JP | 2017167762 A | 9/2017 |
| KR | 1020120070995 A | 7/2012 |
| RU | 2588598 C2 | 7/2016 |
| WO | WO-2007026026 A1 | 3/2007 |
| WO | WO-2016151479 A1 | 9/2016 |

OTHER PUBLICATIONS

The Korean Intellectual Property Office, Notice of Allowance, Vega Grieshaber KG, "Sensor for Generating Power Management Data", Korean Patent Application No. 10-2022-7023812, Nov. 30, 2024, 4 pages.

* cited by examiner

SENSOR FOR GENERATING POWER MANAGEMENT DATA

FIELD OF INVENTION

The invention relates to process automation, in particular in an industrial environment. In particular, the invention relates to a sensor, in particular a self-learning sensor, a control unit for such a sensor, a measuring system with one or more such sensors, a method for, possibly self-learning, planning of measuring intervals and for, possibly self-learning, power management of a sensor, a program element, a computer-readable medium and the use of a computing unit in a measuring system.

BACKGROUND

In process automation in the industrial environment, sensors such as level sensors, limit level sensors, pressure sensors or flow sensors are used. To save energy, such sensors are switched on cyclically or according to a fixed time pattern and the measuring process is triggered. Afterwards, the sensors are switched off again or set to a low-energy (low-power) standby mode.

SUMMARY

It is an object of the present invention to reduce the power requirements of sensors.

This object is solved by the features of the independent patent claims. Further embodiments of the invention result from the subclaims and the following description of embodiments.

A first aspect of the present disclosure relates to a sensor, possibly a self-learning sensor, comprising a control unit configured to analyze data available to the sensor, in particular measurement data of the sensor and/or further data, to generate power management data. The power management data are configured to select a power saving mode of a wireless module of the sensor from a plurality of available power saving modes and/or to control the times of measurement intervals of the sensor and/or to perform power management of the sensor.

The term "control unit" is to be interpreted broadly. The control unit may be a coherent unit; however, it may also be distributed in the sensor and/or its environment, for example in the cloud. The control unit is, for example, an electrical circuit comprising a processor.

According to an embodiment, the plurality of available power saving modes include a power saving mode, PSM.

According to an embodiment, the multiple available power saving modes include an extended discontinuous reception, eDRX, mode.

According to an embodiment, the plurality of available power saving modes include disabling the wireless module.

According to an embodiment, the control unit is arranged to take into account the energy required when operating the power saving mode when analyzing the data available from the sensor and when selecting the power saving mode from the multiple power saving modes available.

According to an embodiment, the control unit is arranged to take into account the maximum permissible duration in the power saving mode until communication has to take place again when analyzing the data available from the sensor and when selecting the power saving mode from the several available power saving modes.

According to an embodiment, the control unit is arranged to take into account the energy required for re-registration or re-dialing into the communication network when analyzing the data available from the sensor and selecting the power saving mode from the multiple power saving modes available.

According to an embodiment, the control unit is arranged to take into account external influences, such as temperature, utilization of a radio channel, or a movement of the sensor, when analyzing the data available from the sensor and when selecting the power saving mode from the several available power saving modes.

According to an embodiment, the control unit is arranged to take into account the frequency of current measurements when analyzing the data available from the sensor and selecting the power saving mode from the multiple power saving modes available.

According to an embodiment, the data available to the sensor also includes measurement data from a neighboring sensor, environmental data, position data and/or location data from the sensor or an external sensor system, signals from an external actuator such as a pump, signals from an external controller or a mobile terminal, and/or calendar entries, information about holidays, non-working days, or times when a container is expected to be filled, for example.

According to a further embodiment, the control unit is set up to reduce or increase the frequency of future measurement intervals in a specific time interval on the basis of the analysis of the data available to the sensor. If, for example, the control unit comes to the conclusion in its analysis that no change in the measurement data is to be expected in a specific future time interval because, for example, the level in a container remains constant, the number of measurement intervals in this time interval can be reduced or even set to zero. If, however, the control unit comes to the conclusion that a change in the measurement data is to be expected during a certain future time interval, for example because the container is being filled or emptied, it can increase the frequency of the measurement intervals in this time interval.

According to a further embodiment, the control unit is set up to determine, based on the analysis of the data available to the sensor, a first time interval in which a change in the measurement data of the sensor is to be expected, and to schedule one or more future measurement intervals in this first time interval. For this purpose, a fast, energy-saving and not very accurate pre-measurement can be performed to detect whether the level might have changed at all, thus generating additional data for the control system.

According to a further embodiment, the control unit is arranged to determine, based on the analysis of the data available to the sensor, a second time interval in which no change in the measurement data of the sensor is to be expected, and to reduce the number of future measurement intervals scheduled in this second time interval.

According to a further embodiment, the control unit is arranged to adjust the frequency of future measurement intervals in a certain time interval on the basis of the analysis of the data available to the sensor, depending on a rate of change of the measurement data to be expected in this time interval. For example, it can be provided that if the control unit comes to the conclusion that the expected rate of change is quite high, the frequency of future measurement intervals in this time interval is further increased, and vice versa.

According to a further embodiment, the possibly self-learning sensor has an internal energy storage and is set up for self-sufficient operation.

In particular, a radio interface can be provided by means of which the possibly self-learning sensor can communicate with an external control unit or an external computing unit. The sensor can be set up to transmit measurement data to such an external unit at specific times.

It can be provided that the external unit takes over the analysis tasks or at least a part of the analysis tasks and then transfers its individual, new power management data to the sensor.

In particular, the external unit can communicate with a number of sensors and collect data from them. It can also collect further data, for example calendar entries etc. and then generate its own power management data from this for each individual sensor, which is then fed to this sensor. This process can be implemented in a self-learning and automated manner, so that the sensors gradually save more and more power and (in other words) no longer take "unnecessary" measurements, or the number of these unnecessary measurements continues to decrease. "Unnecessary" measurements in this context are in particular those measurements which do not lead to a new measurement result that has changed in contrast to a previous measurement result, for example because the level has not changed or it has changed only very slowly.

In particular, the possibly self-learning sensor can be set up for process automation in an industrial environment.

The sensor can be, for example, a level sensor, a point level sensor, a flow sensor or a pressure sensor. In particular, a radar sensor, an ultrasonic sensor, a radiometric sensor, a vibration sensor, a capacitive sensor or a conductive sensor.

A further aspect relates to a control unit for a possibly self-learning sensor, set up for analyzing data available to the sensor, in particular measurement data of the sensor, for generating power management data, the power management data being implemented for selecting a power saving mode of a wireless module of the sensor from a plurality of available power saving modes and/or for controlling the times of measurement intervals of the sensor and/or for power management of the sensor.

In particular, provision can be made for the control unit to be located remotely from the sensor and to exchange data with it via a wired interface or a radio interface.

Another aspect of the present disclosure relates to a measurement system, arranged for autonomously generating power management data for optionally self-learning control of measurement intervals and for self-learning power management of sensors. The measuring system comprises one or more self-learning sensors described above and below, as well as a control unit described above and below and/or a computing unit described above and below, which is set up for storing the power management data and for forwarding the stored power management data to a new sensor of the measuring system.

It may be envisaged that when a new sensor is added to the measuring system, it automatically receives its individual power management data from the computing unit or the control unit when it is put into operation. In this case, the individual sensor can have a relatively slim design and, in the simplest case, is only capable of executing the control commands contained in the uploaded power management data and carrying out corresponding measurements, as well as transmitting the measurement results to an external unit at specific times.

A further aspect of the present disclosure relates to a method for optionally self-learning scheduling of measurement intervals and for optionally self-learning power management of a sensor, in which the data available to the sensor are analyzed, in particular measurement data of the sensor, to generate power management data, the power management data being implemented for selecting a power saving mode of a wireless module of the sensor from a plurality of available power saving modes and/or for controlling the times of measurement intervals of the sensor and/or for power management of the sensor.

A further aspect relates to a program element that, when executed on a control unit of an optionally self-learning sensor or a computing unit described above and below, instructs the control unit or the computing unit to perform the steps described above.

Another aspect relates to a computer-readable medium on which a program element described above is stored.

Another aspect relates to the use of a computing unit in a measurement system, for storing the power management data and for passing the stored power management data to a new sensor of the measurement system.

The term "process automation in the industrial environment" can be understood as a subfield of technology that includes all measures for the operation of machines and plants without the involvement of humans. One goal of process automation is to automate the interaction of individual components of a plant in the chemical, food, pharmaceutical, petroleum, paper, cement, shipping or mining industries. For this purpose, a variety of sensors can be used, which are especially adapted to the specific requirements of the process industry, such as mechanical stability, insensitivity to contamination, extreme temperatures and extreme pressures. Measured values from these sensors are usually transmitted to a control room, where process parameters such as level, limit level, flow rate, pressure or density can be monitored and settings for the entire plant can be changed manually or automatically.

One subarea of process automation in the industrial environment concerns logistics automation. With the help of distance and angle sensors, processes within a building or within a single logistics facility are automated in the field of logistics automation. Typical applications include systems for logistics automation in the area of baggage and freight handling at airports, in the area of traffic monitoring (toll systems), in retail, parcel distribution or also in the area of building security (access control). Common to the examples listed above is that presence detection in combination with precise measurement of the size and location of an object is required by the respective application. Sensors based on optical measurement methods using lasers, LEDs, 2D cameras or 3D cameras that measure distances according to the time-of-flight (ToF) principle can be used for this purpose.

Another sub-area of process automation in the industrial environment concerns factory/production automation. Use cases for this can be found in a wide variety of industries such as automotive manufacturing, food production, the pharmaceutical industry or generally in the field of packaging. The goal of factory automation is to automate the production of goods by machines, production lines and/or robots, i.e. to let it run without the involvement of humans. The sensors used in this process and the specific requirements with regard to measuring accuracy when detecting the position and size of an object are comparable to those in the previous example of logistics automation.

The program element may, for example, be loaded and/or stored in a main memory of a data processing device, such as a data processor, wherein the data processing device may also be part of an embodiment of the present invention. This data processing device may be arranged to perform method steps of the method described above. The data processing device may further be arranged to execute the computer program and/or the method automatically and/or to execute input from a user. The computer program may also be provided over a data network, such as the Internet, and downloaded from such a data network into the memory of the data processing device. The computer program may also comprise an update to an existing computer program, whereby the existing computer program may be enabled to perform the method described above, for example.

The computer-readable (storage) medium may in particular, but not necessarily, be a non-volatile medium that is particularly suitable for storing and/or distributing a computer program. The computer-readable storage medium may be a CD-ROM, a DVD-ROM, an optical storage medium, a solid-state medium, or the like, provided with or as part of other hardware. Additionally or alternatively, the computer-readable storage medium may be distributed or distributed in other forms, such as over a data network, such as the Internet or other wired or wireless telecommunications systems. For this purpose, the computer-readable storage medium may take the form of one or more data packets, for example.

Further embodiments are described below with reference to the figures. The illustrations in the figures are schematic and not to scale. If the same reference signs are used in the following description of the figures, these designate the same or similar elements.

DETAILED DESCRIPTION OF EMBODIMENTS

Figure 1:
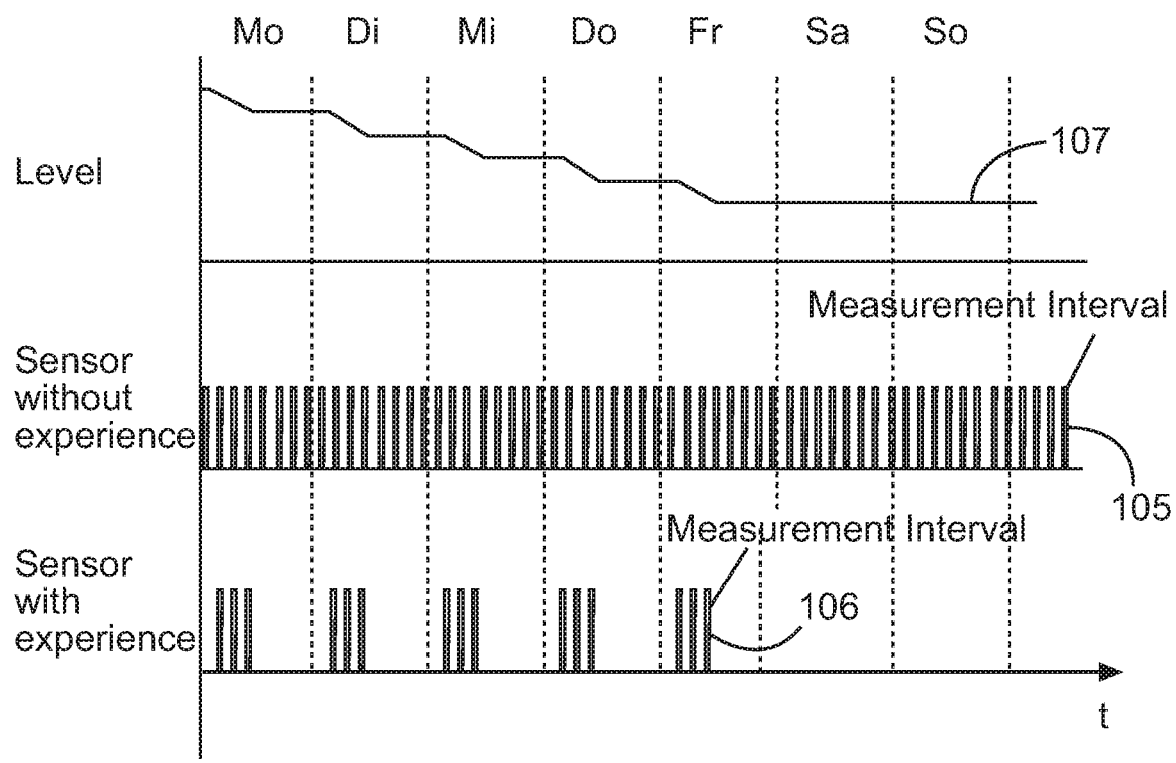
FIG. 1 shows a time diagram of measurement intervals of two sensors.

FIG. 1 shows a time diagram of the measurement intervals 105 of a sensor before the self-learning process, as well as the measurement intervals 106 of a, for example self-learning, sensor during or after a self-learning process with intelligent power management described above.

The measurement curve 107 shows the course of the measurement data recorded by the sensor (for example a level, a pressure or a flow) as a function of time. Over the weekdays Monday to Sunday, the level decreases, remaining constant from Friday afternoon to Monday morning.

The sensor "without experience" is operated in a fixed time grid, with constant time intervals between the individual measuring intervals 105. This ensures intensive energy consumption and can result in regular, premature replacement of used batteries or accumulators. This requires maintenance effort or even a new purchase or reassembly of the sensors if replacement of the energy accumulators is not possible.

Through the self-learning process, if necessary, the sensor learns not to measure according to a fixed rigid time pattern, but only when a measurement appears necessary. This significantly reduces the energy consumption of the sensors.

In this way, a low-maintenance and energy-saving sensor system (measuring system) with possibly self-learning sensors can be implemented, whereby each sensor calculates or receives its own power management data, which is regularly adapted to the measuring environment.

The measurement intervals 106 show that the sensor has learned "with experience" to measure only in those time intervals during which the measurement data also change, i.e. the curve 107 has a slope and equals zero (because the level falls). No measurement is made during the plateaus.

Figure 2:
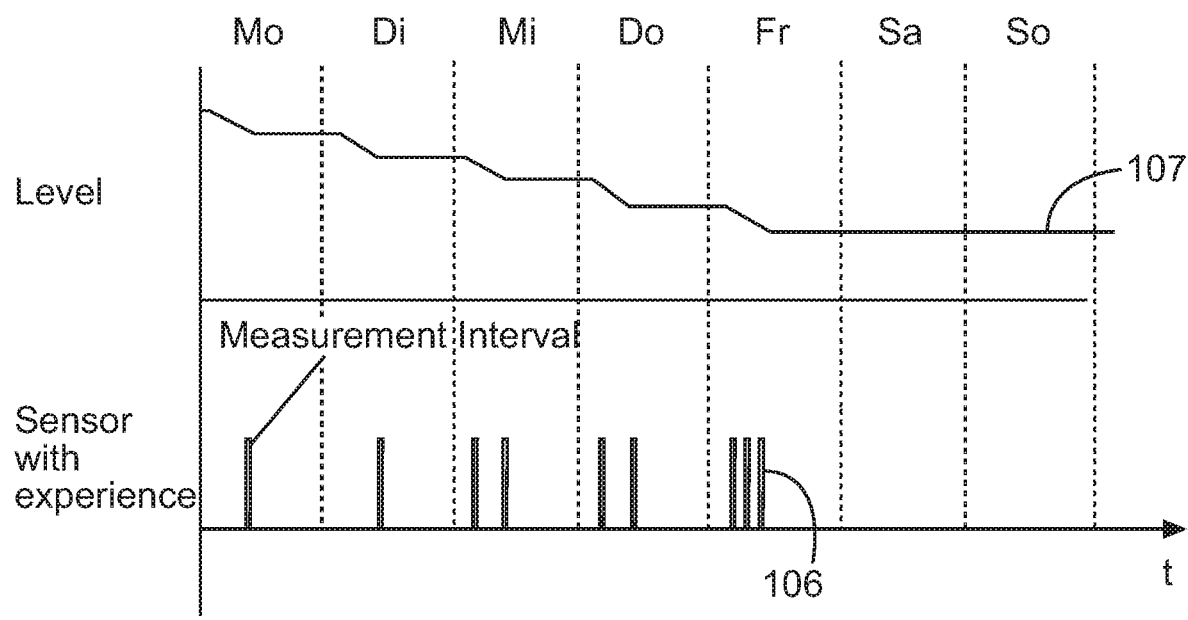
FIG. 2 shows another time diagram of measurement intervals.

FIG. 2 shows another example of the time distribution of the measurement intervals. Here, too, measurements are only taken in those time intervals in which the fill level drops. The lower the fill level is (especially on Friday), the more frequently measurements are taken during emptying to avoid the container running empty.

The measurements are triggered by intelligent measurement intervals and power management.

Thus, the energy consumption of the complete measuring point can be significantly reduced. On non-working days, or when a tank is in the storage of the silo filler, no measurement takes place.

The possibly self-learning measuring intervals can be generated, for example, by the following data:
  Analysis of own level measurement data (day, night, pause times, tank content (fewer measurements when the tank is full), emptying process (fewer measurements when small quantities are taken));
  Analysis of measurement data from a sensor network;
  Analysis by internal or external sensor technology (for example, environmental, positional or location data);
  Analysis by external signals from external actuators (for example pump), controllers or mobile devices;
  Analysis of preset settings or calendars (for example, weekends, holidays, company vacations).

The sensor may be set up to learn the optimal times to measure independently through experience from the above data.

This can extend battery life and/or sensor life.

The sensor becomes smarter and more effective in its energy savings through its self-learning process and the increasingly long period of self-learning.

It can be provided that the sensor automatically adjusts the time and length of the measurement interval as well as the frequency of measurements in this measurement interval accordingly in case of unforeseen level changes. An example of this is temporary Saturday work. On subsequent Saturdays, a measurement is carried out until no more level changes occur on Saturdays.

In particular, it can be provided that the experience values of a sensor are transferred to other sensors of the customer. The experience values of the sensor(s) can be stored locally or decentrally in a cloud for further processing. Triggering the measurement by intelligent measurement intervals and power management can be used in stand-alone sensors with energy storage as well as in wired sensors. The sensors can be permanently installed or mobile.

The module for generating intelligent measuring intervals and power management can be permanently integrated in the sensor or used as an extension of existing measuring points.

Figure 3:
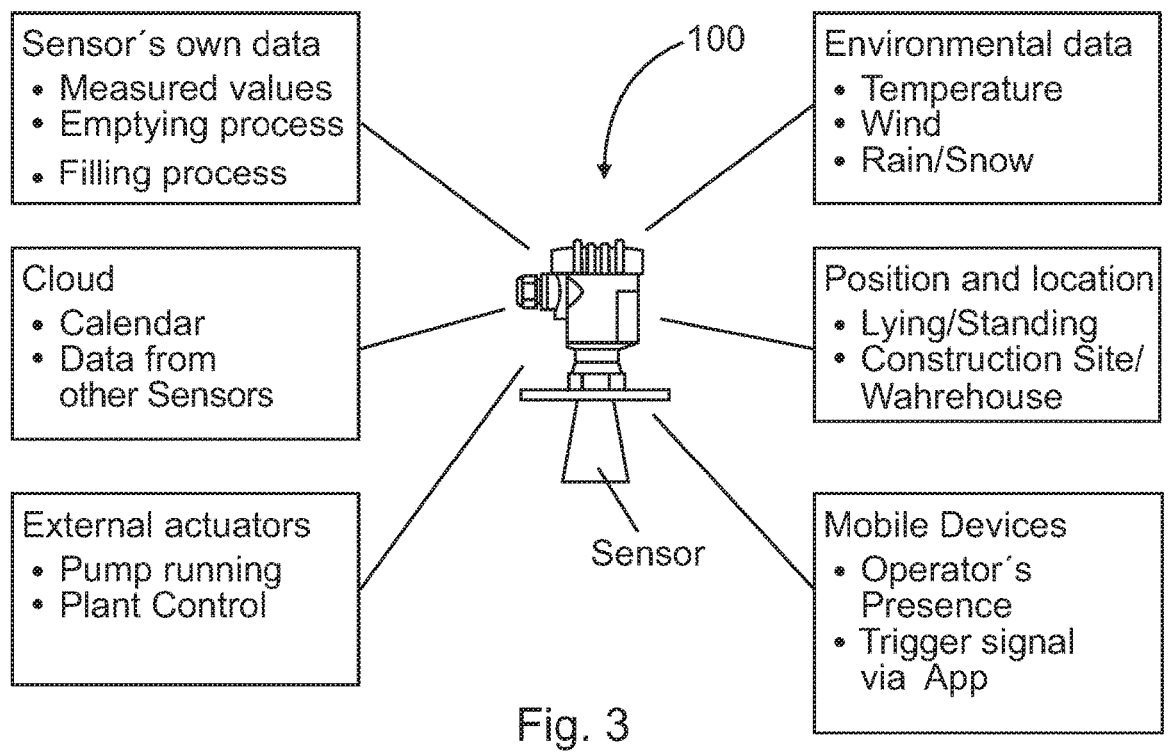
FIG. 3 shows an overview with examples of possible data sources for self-learning sensors.

FIG. 3 shows examples of possible data sources for a possible self-learning sensor 100.

One possible data source for the data available from the sensor that is used for the analysis is sensors own data, such as measured values, information about emptying processes and filling processes.

Another example is the data available in an external data storage, for example in a cloud. This is, for example, calendar entries, calendar data or data from other sensors.

Another example is data and signals from external actuators (for example, "pump running" or "plant control").

Another example is environmental data, such as temperature, wind, rain, snow.

Another example is position and location data, such as information on whether the sensor is installed horizontally or vertically, or whether the container is lying or standing upright, or whether the container is on a construction site or in a warehouse.

Another example is mobile device data, such as operator presence or a trigger signal via an app.

Figure 4:
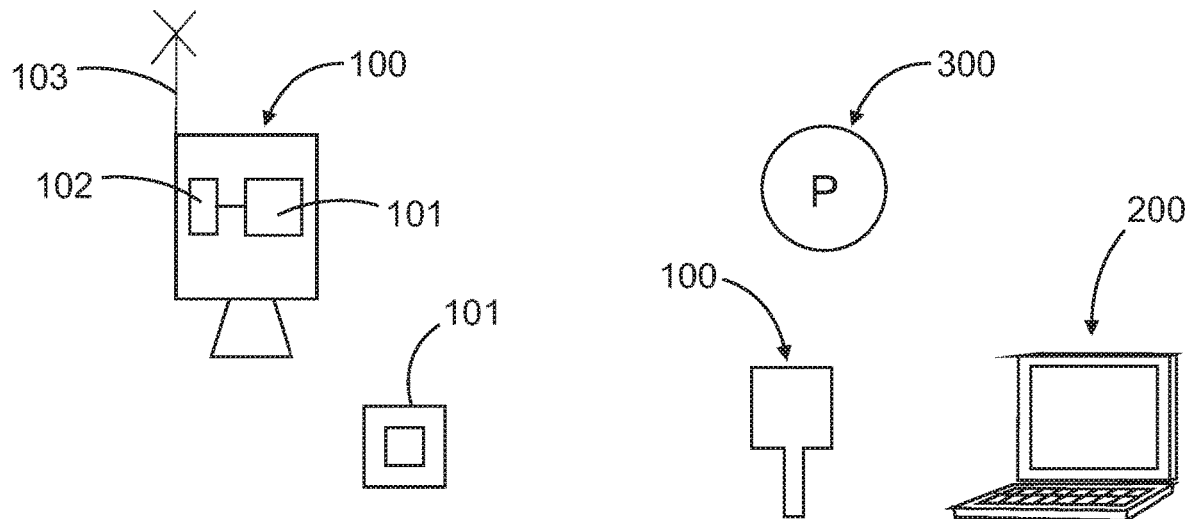
FIG. 4 shows a measuring system according to an embodiment.

FIG. 4 shows a measurement system with several optionally self-learning sensors 100, a new sensor 300, a control unit 101 located in one of the optionally self-learning sensors, another control unit 101 located outside the optionally self-learning sensors, and a central processing unit 200.

The computer unit is set up to receive data from all sensors and to analyze it centrally. It can also be set up to collect the data described with regard to FIG. 3 and to include it in the analysis in order to generate individual power management data for each sensor, which can then be transmitted to the sensors. In particular, the sensor 100 has a wireless module 103 that is used for transmitting measurement data.

Stand-alone sensors 100 with mobile wireless modules (mobile radio modems, mobile radio chips for, for example, "NBIoT-", "LTEM1-", etc.) must dial in to the network operator before sending data for the first time. This involves a data connection and registration with the corresponding network operator, via a cell tower. As long as the device is registered in the network, there is no need to dial in again, which saves energy. The wireless module 103 must be permanently supplied with power in order to be able to communicate regularly with the radio mast.

If no data communication is required for a longer period of time, the wireless module can be set to a power saving mode (e.g. eDRX, PSM, . . . ), which can reduce the required current of the wireless module from milliamps to a few microamps. These modes also eliminate the need for new dial-up in the cellular network.

For stand-alone sensors, this significantly increases the battery life. With mains-powered (230 V) sensors or sensors supplied by an interface (4-20 mA), the power consumption is reduced.

If the sensor 100 is not needed for a very long time, it is advantageous to completely deactivate the wireless module 103 in order to save the power consumption of a few microamperes in power saving mode. However, this makes it necessary to re-register with the cellular network before sending data.

Stand-alone sensors usually only send data via mobile radio at specified times. For example, every two hours from 8:00 a.m. to 4:00 p.m. on weekdays. At night and on weekends, however, not at all or only every eight hours. This can make it advantageous to switch off or deactivate the mobile wireless module for a long idle period.

One or more of the following factors can be included in deciding which of the power saving modes to use or turn off. Not only the current value of a factor, but also the historical/old value(s), as well as the values that can be expected in the future, can be taken into account:
1. Power saving modes available (eDRX, PSM or . . . )
2. Required energy in the respective power saving mode; this can be measured/measured during operation or be an expected value (default).
3. Mobile technology used (NB-IoT, LTE-M1, . . . ).
4. Desired/scheduled time in power saving mode.
5. Maximum permissible duration in the respective power saving mode until communication has to take place again (determined by the network operator).
6. Band used for communication (is the band to be used known? Number of bands tested for dial-up; Different power requirements for different bands).
7. Energy required for a new registration/dial-in (measured/measured during operation; expected value (default); in simplified form, the time required for a dial-in process can be used here (measured or specified)).
8. Transmission power during a dial-up.
9. Reception quality of the mobile radio link.
10. Which power saving mode is more advantageous for the power supply? Is the power supply designed or efficient (efficiency) for the low current demand in power saving mode? For example, can passivation of a lithium thionyl chloride battery be prevented?
11. External influences, such as temperature, utilization of the radio channel, movement of the sensor and an associated radio cell change. Is the sensor moving right now? Is the sensor likely or certain to move?

The factors listed above may also change the selection of the power saving mode to be used (eDRX, PSM, etc.).

Thus, a method is provided for decision making of selecting power saving modes or disabling cellular modules to optimize the runtime of stand-alone sensors or to reduce power consumption for continuously powered sensors.

For example, the control unit 101 is programmed as follows: Data is sent by cellular radio every two hours on weekdays from 8:00 am to 4:00 pm. On weekdays from 4:00 p.m. to 8:00 a.m., data is sent every four hours. On weekends and holidays, the rhythm between sending data is eight hours.

By using several of the above factors, it was calculated by the sensor or the control unit that the power saving mode PSM in a two-hour rhythm provides an advantage in terms of energy. At a rhythm of four hours, the device is operated in power saving mode eDRX. From a transmission pause of six hours, the wireless module is deactivated to save the quiescent current of several microamperes.

Figure 5:
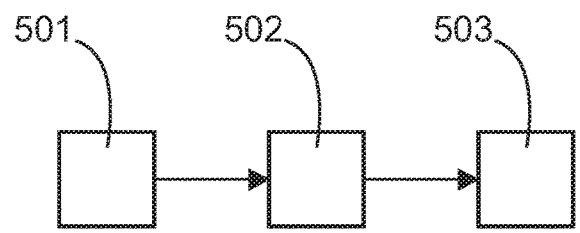
FIG. 5 shows a flow diagram of a process according to an embodiment.

FIG. 5 shows a flowchart of a method according to one embodiment. In step 501, a large amount of data is collected. In step 502, this data is analyzed centrally (or it is analyzed by a sensor) and in step 503, power management data is generated therefrom. This power management data has commands for selecting a power saving mode of the wireless module from a plurality of available power saving modes and/or for controlling the times of measurement intervals of the sensors and/or for power management of the sensors.

Supplementally, it should be noted that "comprising" and "having" do not exclude other elements or steps, and the indefinite articles "a" or "an" do not exclude a plurality. It should further be noted that features or steps that have been described with reference to any of the above embodiments may also be used in combination with other features or steps of other embodiments described above. Reference signs in the claims are not to be regarded as limitations.

The invention claimed is:

1. A sensor, comprising:
a control unit, configured to analyze data available to the sensor, the data comprising measurement data of the sensor and data from an external data storage, the data from the external data storage comprising information on an expected duration of a power saving mode, and to generate power management data based on the analysis of the measurement data of the sensor and the data from the external data storage; and a wireless module configured to transmit measurement data, wherein the control unit is configured to use the power management data to select a power saving mode of the wireless module from a plurality of available power saving modes, and to control the times of measurement intervals of the sensor, wherein the control unit is configured to select extended discontinuous reception (eDRX) as the power saving mode if the expected duration of the power saving mode is a first time span, wherein the control unit is configured to select Power Saving Mode (PSM) as the power saving mode if the expected duration of the power saving mode is a second time span which is longer than the first time span, and wherein the control unit is configured to select disabling the wireless module as the power saving mode if the expected duration of the power saving mode is a third time span which is longer than the first time span and the second time span.

2. The sensor according to claim 1, wherein the control unit, when analyzing the data available from the sensor and selecting the power saving mode from the plurality of available power saving modes, takes into account the energy required when operating the power saving mode.

3. The sensor according to claim 1, wherein the control unit, when analyzing the data available from the sensor and selecting the power saving mode from the plurality of available power saving modes, takes into account the maximum allowable duration in the power saving mode until communication must occur again.

4. The sensor according to claim 1, wherein the control unit, when analyzing the data available from the sensor and selecting the power saving mode from the plurality of available power saving modes, takes into account the power required for re-registration or re-dialing into the communication network.

5. The sensor according to claim 1, wherein the control unit, when analyzing the data available from the sensor and when selecting the power saving mode from the plurality of available power saving modes, takes into account external influences, such as temperature, utilization of a radio channel, or a movement of the sensor.

6. The sensor according to claim 1, wherein the control unit, when analyzing the data available from the sensor and selecting the power saving mode from the plurality of available power saving modes, takes into account the frequency of the current measurements.

7. A control unit for a sensor, comprising:
a computing unit configured to analyze the data available to the sensor, the data comprising measurement data of the sensor and data from an external data storage, the data from the external data storage comprising information on an expected duration of a power saving mode, and to generate the power management data based on the analysis of the measurement data of the sensor and the data from the external data storage, wherein the computing unit is configured to use the power management data to select a power saving mode from a plurality of available power saving modes of a wireless module of the sensor and to control the times of measurement intervals of the sensor, wherein the computing unit is configured to select extended discontinuous reception (eDRX) as the power saving mode if the expected duration of the power saving mode is a first time span, wherein the computing unit is configured to select Power Saving Mode (PSM) as the power saving mode if the expected duration of the power saving mode is a second time span which is longer than the first time span, and wherein the computing unit is configured to select disabling the wireless module as the power saving mode if the expected duration of the power saving mode is a third time span which is longer than the first time span and the second time span.

8. The control unit according to claim 7, wherein the control unit is arranged remotely from the sensor.

9. A measuring system configured to autonomously generate power management data for controlling measuring intervals and for power management of sensors, comprising:
the sensor according to claim 1; and
the control unit according to claim 7 and/or a computing unit, each configured to store the power management data and to forward the stored power management data to a second sensor of the measuring system.

10. A method for scheduling measurement intervals and power management of a sensor, the method comprising:
analyzing data available to the sensor, the data comprising measurement data of the sensor and data from an external data storage, the data from the external data storage comprising information on an expected duration of a power saving mode;
generating power management data based on the analysis of the measurement data of the sensor and the data from the external data storage;
using the power management data to select a power saving mode from a plurality of available power saving modes of a wireless module of the sensor and to control the times of measurement intervals of the sensor;
selecting extended discontinuous reception (eDRX) as the power saving mode if the expected duration of the power saving mode is a first time span;
selecting Power Saving Mode (PSM) as the power saving mode if the expected duration of the power saving mode is a second time span which is longer than the first time span; and
selecting disabling the wireless module as the power saving mode if the expected duration of the power saving mode is a third time span which is longer than the first time span and the second time span.

11. A non-transitory program element that, when executed on a control unit or a computing unit of a sensor, instructs the control unit or the computing unit to perform the following step:
analyzing data available to the sensor, the data comprising measurement data of the sensor and data from an external data storage, the data from the external data storage comprising information on an expected duration of a power saving mode;
generating power management data based on the analysis of the measurement data of the sensor and the data from the external data storage,
using the power management data to select a power saving mode from a plurality of available power saving modes of a wireless module of the sensor and to control the times of measurement intervals of the sensor;
selecting extended discontinuous reception (eDRX) as the power saving mode if the expected duration of the power saving mode is a first time span;
selecting Power Saving Mode (PSM) as the power saving mode if the expected duration of the power saving mode is a second time span which is longer than the first time span; and selecting disabling the wireless module as the power saving mode if the expected duration of the power saving mode is a third time span which is longer than the first time span and the second time span.

12. A non-transitory computer-readable medium on which is stored a program element according to claim 11.

* * * * *